(12) United States Patent
Schmitt et al.

(10) Patent No.: US 10,800,367 B2
(45) Date of Patent: Oct. 13, 2020

(54) REINFORCED FOUR-BAR LINKAGE

(71) Applicant: Dr. Ing. h.c. F. Porsche Aktiengesellschaft, Stuttgart (DE)

(72) Inventors: Hans-Juergen Schmitt, Muehlacker (DE); Alexander Eichinger, Pforzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 49 days.

(21) Appl. No.: 16/029,773

(22) Filed: Jul. 9, 2018

(65) Prior Publication Data

US 2019/0054881 A1 Feb. 21, 2019

(30) Foreign Application Priority Data

Aug. 17, 2017 (DE) .......................... 10 2017 118 812

(51) Int. Cl.
*B60R 21/13* (2006.01)

(52) U.S. Cl.
CPC ........ *B60R 21/13* (2013.01); *B60R 2021/135* (2013.01)

(58) Field of Classification Search
CPC ........................... B60R 21/13; B60R 2021/134
USPC ....................................................... 280/756
See application file for complete search history.

(56) References Cited

U.S. PATENT DOCUMENTS

| 3,224,085 | A * | 12/1965 | Black | B23K 9/0026 |
| | | | | 228/212 |
| 2005/0280253 | A1 * | 12/2005 | Queveau | B60R 21/13 |
| | | | | 280/756 |
| 2008/0203717 | A1 * | 8/2008 | Helsper | B60R 21/13 |
| | | | | 280/756 |
| 2008/0217897 | A1 * | 9/2008 | Latussek | B60R 21/13 |
| | | | | 280/756 |
| 2010/0044988 | A1 * | 2/2010 | Rochester | B60G 7/001 |
| | | | | 280/124.116 |
| 2011/0148060 | A1 * | 6/2011 | Cuttino | B60G 3/26 |
| | | | | 280/86.751 |
| 2015/0151618 | A1 * | 6/2015 | Haimerl | B60J 7/061 |
| | | | | 296/107.03 |

FOREIGN PATENT DOCUMENTS

| DE | 102006057030 A1 * | 6/2008 | ............. B60R 21/13 |
| DE | 102007060884 A1 * | 6/2009 | ............. B60R 21/13 |
| DE | 102010061306 A1 * | 6/2012 | ............. B60R 21/13 |

(Continued)

OTHER PUBLICATIONS

Machine Translation of DE102010061306 (Year: 2012).*

(Continued)

*Primary Examiner* — Paul N Dickson
*Assistant Examiner* — Kurtis Nielson
(74) *Attorney, Agent, or Firm* — Gerald E. Hespos; Michael J. Porco; Matthew T. Hespos

(57) ABSTRACT

A coupling link (18) for a hinged roll bar (12) has first and second cover plates (24, 26) spaced apart from each other. An axle bearing (32, 50) is connected to the two cover plates (24) for forming a rotary joint (40) with a first link lever (14) that can be mounted on the axle bearing (32, 50). The coupling link (18) has, in the region of the rotary joint (40), a reinforcing element (42) that forms a support of the first link lever (14).

12 Claims, 6 Drawing Sheets

(56) References Cited

FOREIGN PATENT DOCUMENTS

DE     10 2013 103 826     10/2014
DE     102013103826 A1 * 10/2014
EP     2364884 A1 * 9/2011  ............. B60R 21/13

OTHER PUBLICATIONS

Machine Translation of DE102013103826 (Year: 2014).*
Machine Translation of DE-102007060884-A1 (Year: 2007).*
Machine Translation of DE-102006057030-A1 (Year: 2006).*
Machine Translation of EP-2364884-A1 (Year: 2010).*
German Examination Report dated Mar. 26, 2018.

* cited by examiner

REINFORCED FOUR-BAR LINKAGE

CROSS REFERENCE TO RELATED APPLICATION

This application claims priority under 35 USC 119 to German Patent Appl. No. 10 2017 118 812.6 filed on Aug. 17, 2017, the entire disclosure of which is incorporated herein by reference.

BACKGROUND

Field of the Invention

The invention relates to a coupling link for a hinged roll bar of a motor vehicle. The invention also relates to a roll bar for a motor vehicle.

Description of the Related Art

DE 10 2013 103 826 A1 discloses a roll-over protective system for a motor vehicle. The roll-over protective system comprises a roll bar that can be brought from a retracted inoperative position into an extended erected position and that has a first and second moveable roll bar limbs. The limbs are connected to each other at their first ends in a height-displaceable second joint, and also a first joint, via which the first roll bar limb is mounted in a rotatable and positionally fixed manner on the motor vehicle. A third roll bar limb is arranged on the second roll bar limb via a third joint and on the motor vehicle in a positionally fixed and rotatable manner via a fourth joint.

Forces are introduced into a vehicle body via the roll bar when the motor vehicle overturns. Hence, it is important for the roll bar to have a high degree of stability to ensure the safety of occupants of the motor vehicle. At the same time, the roll bar is intended to be as compact and lightweight as possible to keep the weight of the vehicle low. The retracted roll bar also must be accommodated as simply as possible in the vehicle body for aerodynamic and esthetic reasons.

An object of the invention is to provide a hinged roll bar with a coupling link that permits a cost-effective hinged roll bar having a good crash performance.

SUMMARY

One aspect of the invention relates to a coupling link for a hinged roll bar of a motor vehicle. The coupling link is configured as a four-bar linkage and comprises first and second cover plates that are spaced apart from each other. An axle bearing is connected to the two cover plates to form a rotary joint with a first link lever that can be mounted on the axle bearing. The coupling link has a reinforcing element in the region of the rotary joint to form a support of the first link lever.

The invention also relates to a roll bar for a motor vehicle. The roll bar comprises first and second link levers that can be coupled to a motor vehicle body. A coupling link is connected in an articulated manner between the first and second link levers. An actuating system is provided for pivoting the first and second link levers and the coupling link between a position retracted in the motor vehicle body and a position extended out of the motor vehicle body.

High impact forces act on the roll bar in the event of a crash in which the motor vehicle overturns, and these impact forces can be absorbed by the first link lever and the coupling link. A reliable connection of the first link lever and the coupling link is ensured by the fact that the coupling link is formed with the reinforcing element in the rotary joint. As a result, forces exerted from the first link lever in the direction of the coupling link do not have to be absorbed solely by the axle bearing, but rather can additionally be absorbed via the reinforcing element. The same applies during loading in the opposite direction. Forces are introduced uniformly into the coupling link. In addition, forces acting on the axle bearing are reduced. As a result, a high degree of safety in an accident and a good crash performance of the roll bar can be achieved.

The first and second cover plates may be connected to each other via a spacer body. The spacer body may have a stable multi-chamber profile.

The roll bar can be extended out of the motor vehicle body to form a guard for vehicle occupants in the event of overturning.

The axle bearing may be a sleeve. The use of material for the axle bearing can thereby be particularly low. For example, the bearing bolt can be produced from an aluminum profile or from a metal sheet bent over to form the sleeve and welded longitudinally. Loading of the axle bearing can be reduced by a separate reinforcing element.

The reinforcing element may be a substantially U-shaped or trough-shaped grip for the first link lever and the inner side of the reinforcing element may be a round profile. The round profile may be concentric with respect to the axle bearing. The reinforcing element can be in close contact with the first link lever. Therefore, force can be absorbed directly from the first link lever into the coupling link. A previous deformation, for example, of the axle bearing is not required here. In particular if the first link lever completely surrounds the axle bearing, the first link lever can be virtually in contact with the round profile of the reinforcing element, and therefore a good force transmission is ensured.

The first cover plate and the second cover plate can be connected to each other via a spacer body, and the reinforcing element may be formed or held on the spacer body. The spacer body enables forces acting on the reinforcing element to be absorbed in the interior of the coupling link and transmitted uniformly to the first and second cover plate. The reinforcing element additionally may be held on the cover plate so that forces also can be introduced directly from the reinforcing element into the cover plates. The spacer body can make elastic and/or plastic twisting of the cover plates onto each other and/or away from each other more difficult, thereby increasing the stability and the crash reliability of the coupling link. The reinforcing element can be formed integrally with the spacer body, or can be connected thereto, for example, by welding or another type of mounting.

The first and second cover plates may be welded to the spacer body. The welding forms a stable unit consisting of the first and second cover plates with the spacer body. The body formed in this manner has high strength and can be produced simply and cost-effectively. A hollow groove may be formed between the first cover plate or the second cover plate and the spacer body in which the respective components are welded to each other.

An end of the coupling link opposite the axle bearing may have an axle for connecting to a second link lever, and an end of the spacer body opposite the axle bearing may have a base profile that forms a reinforcement of the axle. The axle can be, for example, a central axle for driving the four-bar linkage. The axle can be designed to correspond to the axle bearing. The axle may be a bolt that is fastened between the first and the second cover plate.

The axle bearing may be attached in a form-fitting manner to the two cover plates. This permits simple installation or removal of the axle bearing. In addition, no prestress or internal stress is necessary during the installation. The axle bearing also simply can be displaced axially and secured.

In an advantageous refinement of the invention, the axle bearing is welded to the two cover plates. The welding produces a stable and permanent connection between the axle bearing and the two cover plates. An assembly can be formed that simply can be mounted in the motor vehicle. A risk of unintentional detaching of the axle bearing is avoided.

In an alternative embodiment, the axle bearing is connected to the first and the second cover plate via a fastening means guided through the axle bearing, in particular screw connection and/or rivet connection and/or locking ring bolt connection. The configuration of the axle bearing in the form of a sleeve results in a cavity that can be used for fastening the cover plates with the aid of the fastening means. For example, a screw can be introduced on one side and can be screwed to a nut on the other side. A screw bolt also can be introduced on the one side and a nut bolt on the other side such that the screw connection can take place in the interior of the bearing bolt. It is also possible to introduce a rivet on the one side and to provide the latter with a locking head on the other side. In addition, a locking ring bolt can be introduced on one side and connected to a locking ring positioned on the other side.

A V groove may be formed in a connecting region between the axle bearing and the two cover plates, and the axle bearing may be welded to each cover plate in the V groove. The V groove facilitates the formation of a reliable weld seam. Furthermore, the bevel that is formed on the cover plates and is part of the V groove enables the axle bearing to be positioned simply and inserted through the cover plates.

The reinforcing element may be formed integrally with a stop for a movement of the first link lever. An additional support can be formed for the first link lever. A movement beyond the stop is prevented, and therefore an additional safety feature for the open roll bar is formed.

A bevel may be formed on the first link lever to facilitate insertion of the axle bearing in the region of the rotary joint. As a result, the first link lever and the coupling link can be positioned reliably with respect to each other when the axle bolt is inserted.

The previous explanations relating to the rotary joint that connects the coupling link and the first link lever apply correspondingly to the connection of the coupling link to the second link lever.

The invention is explained by way of example below using preferred exemplary embodiments with reference to the attached drawings, wherein the features illustrated below can constitute both individually in each case and in combination an aspect of the invention.

DETAILED DESCRIPTION

Figure 1:
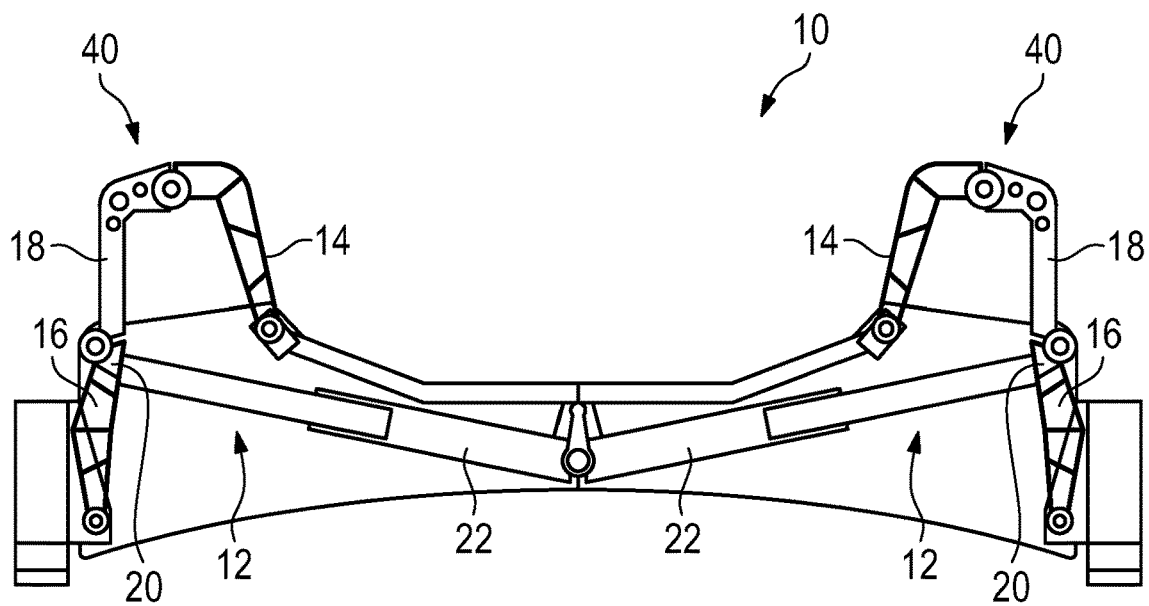
FIG. 1 shows a schematic sectional view of part of a motor vehicle with hinged roll bars according to a first preferred embodiment in the extended state.

FIG. 1 shows a motor vehicle 10 according to a first embodiment. A region behind a front or rear seat row of the motor vehicle 10 is illustrated, and two roll bars 12 are extended from this region, one for a driver's side and one for a passenger's side. Each roll bar 12 has an inner first link lever 14, also referred to as an inner link 14, and an outer second link lever 16, also referred to as an outer link 16. The inner first link 14 is coupled to a motor vehicle body, and the outer second link lever 16 also is coupled to the motor vehicle body. The link levers 14, 16 are connected to each other in a manner coupled in terms of movement via a coupling link 18 that is in each case connected in an articulated manner. The first link lever 14, the coupling link 18 and the second link lever 16 form a four-bar linkage. A telescopic actuating system 22 in the manner of a toggle lever acts via an extension 20 on a point of articulation, at which the coupling link 18 is connected to the second link lever 16. The actuating system 22 also is connected in an articulated manner to the body of the motor vehicle 10.

Figure 2:
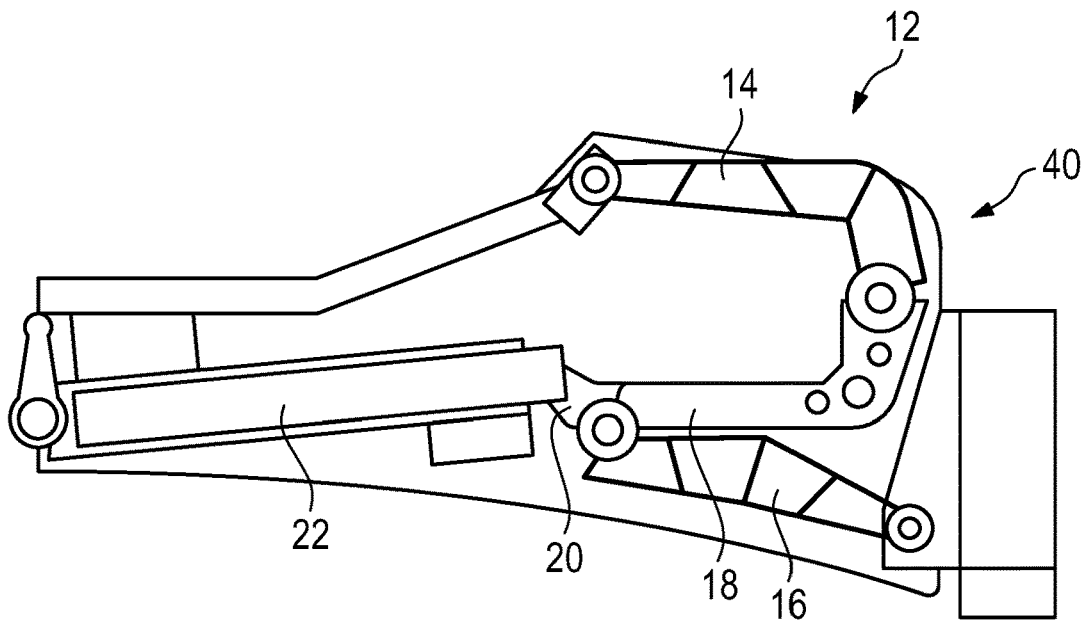
FIG. 2 shows a schematic sectional view of one of the roll bars from FIG. 1 in a retracted state.
Figure 3:
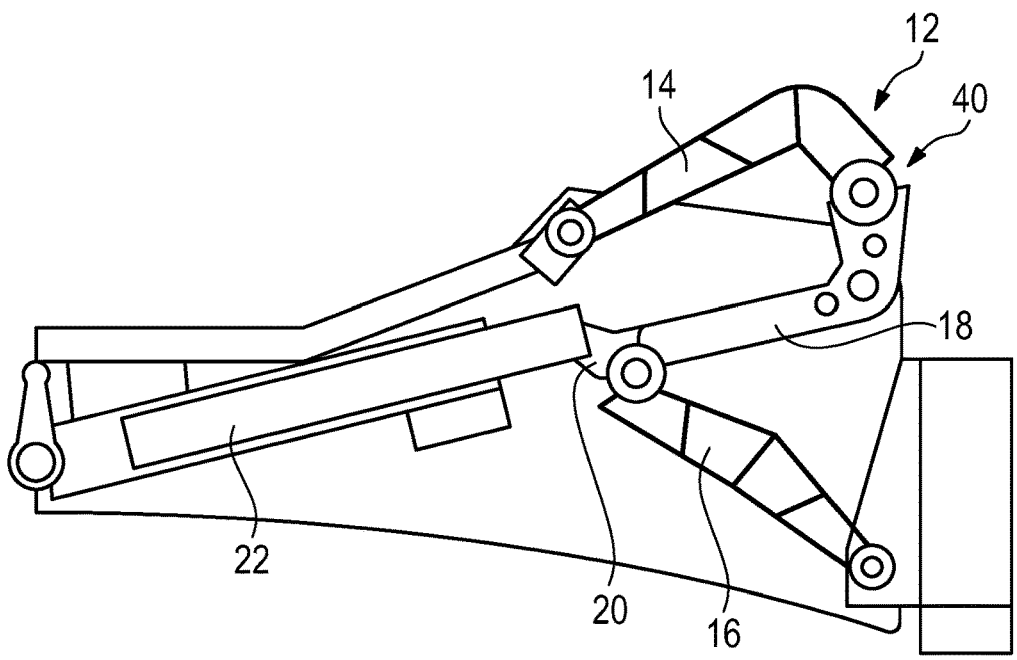
FIG. 3 shows a schematic sectional view of the roll bar from FIG. 2 in a partially extended state.
Figure 4:
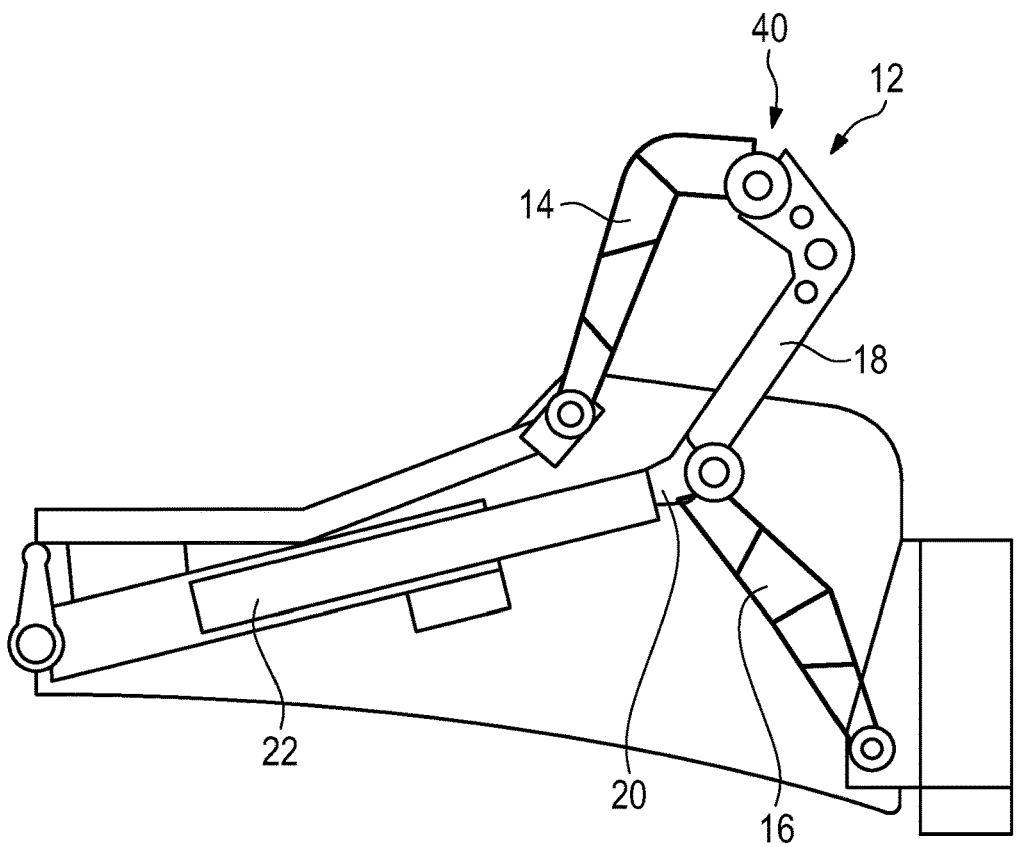
FIG. 4 shows a schematic sectional view of the roll bar from FIG. 2 in a virtually completely extended state.
Figure 5:
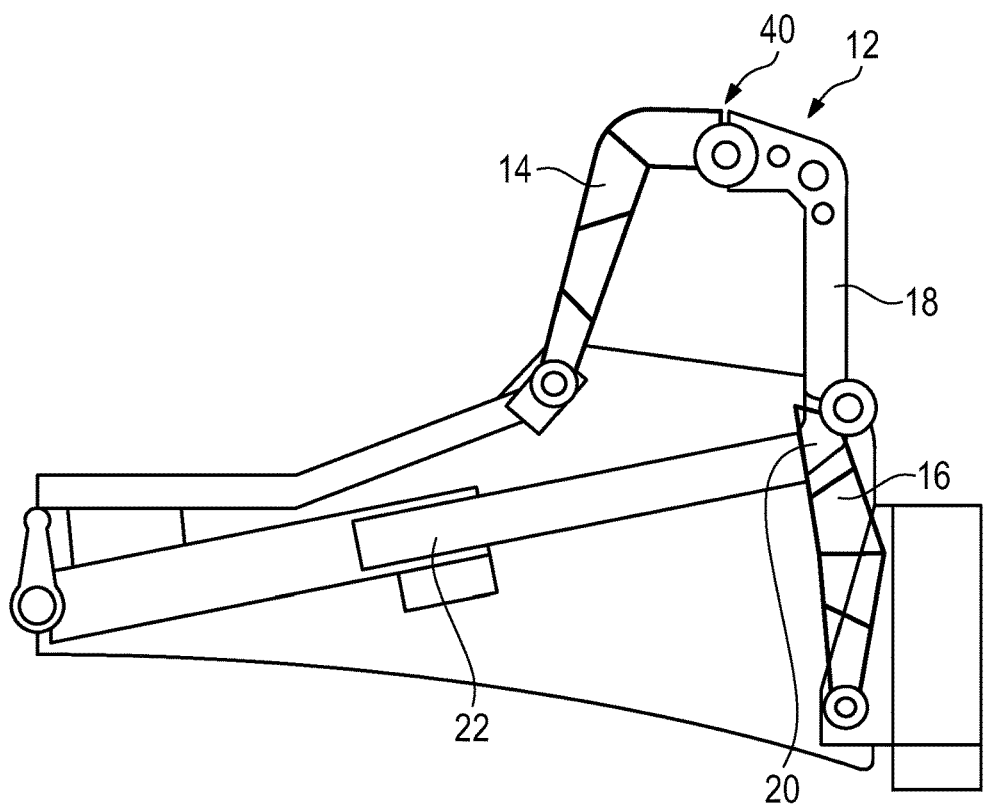
FIG. 5 shows a schematic sectional view of the roll bar from FIG. 2 in a completely extended state.

In the retracted state of the roll bar 12, the actuating system 22 is retracted completely, as illustrated in FIG. 2. In the retracted position illustrated in FIG. 2, the first link lever 14, the coupling link 18 and the second link lever 16 are positioned in a manner substantially completely recessed in the body of the motor vehicle 10. If the roll bar 12 is intended to be extended, the actuating system 22 builds up a force that allows the coupling link 18 to lift off from the second link lever 16, as illustrated in FIG. 3, and moves the point of articulation in the direction of its dead center, as illustrated in FIG. 4, until the second link lever 16 strikes laterally in the extended position, as illustrated in FIG. 5. In the extended position, the dead center of the point of articulation can be at least slightly exceeded such that a position of the roll bar 12 beyond the dead center arises in the extended position. In the extended position, the coupling link 18 and the second link lever 16 are aligned with each other substantially in the vertical direction, thus resulting in a particularly great erecting height for the roll bar 12. The coupling link 18 and the first link lever 14 have substantially L-shapes and produce a sufficient extent of the roll bar 12 transversely with respect to the direction of travel of the motor vehicle 10 to achieve sufficient protection for the occupants.

Figure 6:
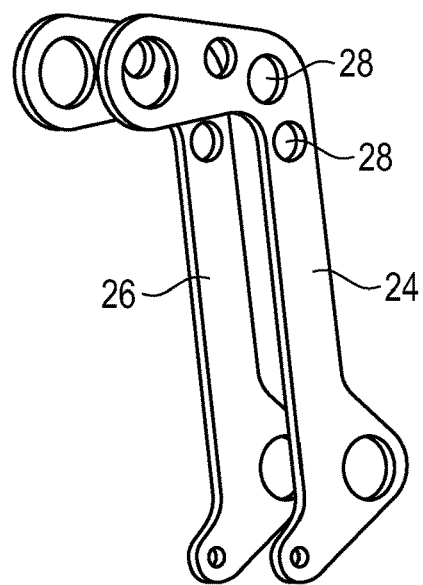
FIG. 6 shows a schematic perspective view of part of a coupling link of the roll bar from FIG. 2 at a first installation time before the joining process.
Figure 7:
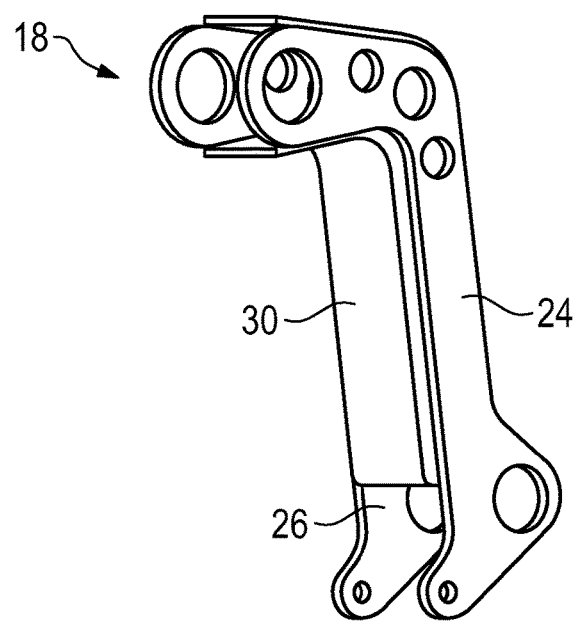
FIG. 7 shows a schematic perspective view of part of a coupling link of the roll bar from FIG. 2 at a second installation time.
Figure 8:
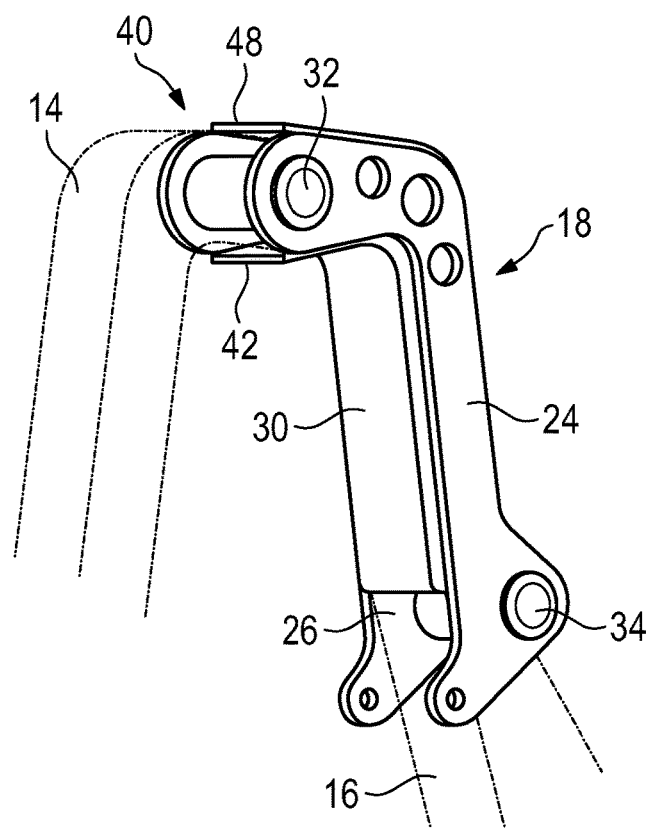
FIG. 8 shows a schematic perspective view of part of a coupling link of the roll bar from FIG. 2 at a third installation time.

As illustrated in FIG. 6, the coupling link 18 has a first cover plate 24 and an identically shaped second cover plate 26, in which through openings 28 are provided for a defined deformation performance in the event of a crash. A spacer body 30 is arranged between the first cover plate 24 and the second cover plate 26.

Figure 9:
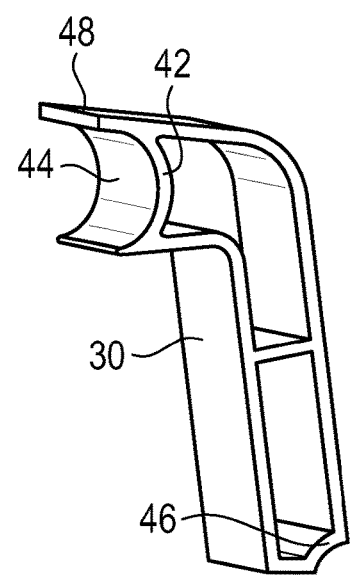
FIG. 9 shows a schematic perspective view of a spacer body of the coupling link of FIG. 7 and FIG. 8.

As illustrated in FIG. 9, the spacer body 30 is configured in the manner of a lightweight construction element and is produced by extrusion. The spacer body 30 is welded to the cover plates 24, 26.

An axle bearing 32 is arranged between the first and the second cover plates 24, 26 of the coupling link 18 at a joint 40 with the first link lever 14. The end of the coupling link 18 facing the second link lever 16 is formed with a bearing bolt 34 that forms an axle 34 for the articulated connection to the second link lever 16. The axle bearing 32 and the bearing bolt 34 therefore are connected fixedly. As illustrated in FIG. 9, the spacer body 30 a lightweight construction element produced by extrusion in this exemplary embodiment.

According to the first embodiment, the axle bearing 32 and the axle bolt 34 are connected to the first and the second cover plate 24, 26 by fastening means, in particular a screw connection or a rivet connection. Accordingly, the axle bearing 32 and the bearing bolt 34 are designed as sleeves, and the fastening means are guided through the cavity. The axle bearing 32 and the bearing bolt 34 are attached in a form-fitting manner to the two cover plates 24, 26.

The coupling link 18 has a reinforcing element 42 in the region of the rotary joint 40. The reinforcing element 42 forms a support of the first link lever 14. The reinforcing element 42 is designed as a substantially U-shaped or trough-shaped grip, for example in the manner of tongs, for the first link lever 14, and the inner side thereof has a round profile 44. The round profile 44 is concentric with the axle bearing 32. The reinforcing element 42 is arranged on the spacer body 30 and is integral therewith.

Furthermore, the end of the coupling link 18 with the axle 34 has a bottom profile 46 that forms a reinforcement of the bearing bolt 34. The bearing bolt 34 is a central axle 34 for driving the four-bar linkage.

The reinforcing element 42 of the coupling link 18 is formed integrally with a stop 48 for movement of the first link lever 14. The stop 48 limits a movement of the roll bar 12 during opening. In addition, breaking the joint 40 open is made difficult.

FIGS. 10 to 13 relate to a coupling link 18 according to a second embodiment. The coupling link 18 of the second embodiment corresponds in substantial aspects to the coupling link 18 described with respect to FIGS. 1 to 9. Features of the coupling link 18 of the second embodiment that are not explicitly described are identical to those of the coupling link 18 of the first embodiment.

The coupling link 18 of the second embodiment is used, as described with respect to the first embodiment, in a roll bar 12 (shown there) for a motor vehicle 10.

Figure 12:
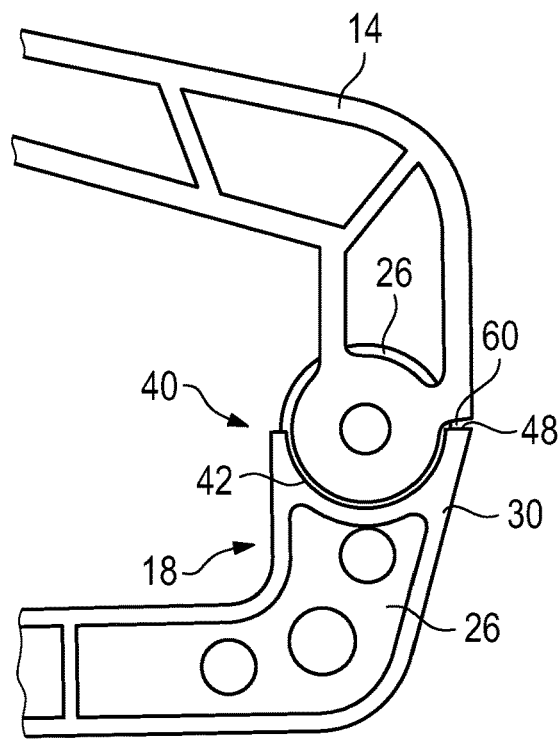
FIG. 12 shows a top view of the rotary joint between the coupling link and the first link lever from FIG. 10 together with the coupling link and the first link lever without a first cover plate.
Figure 13:
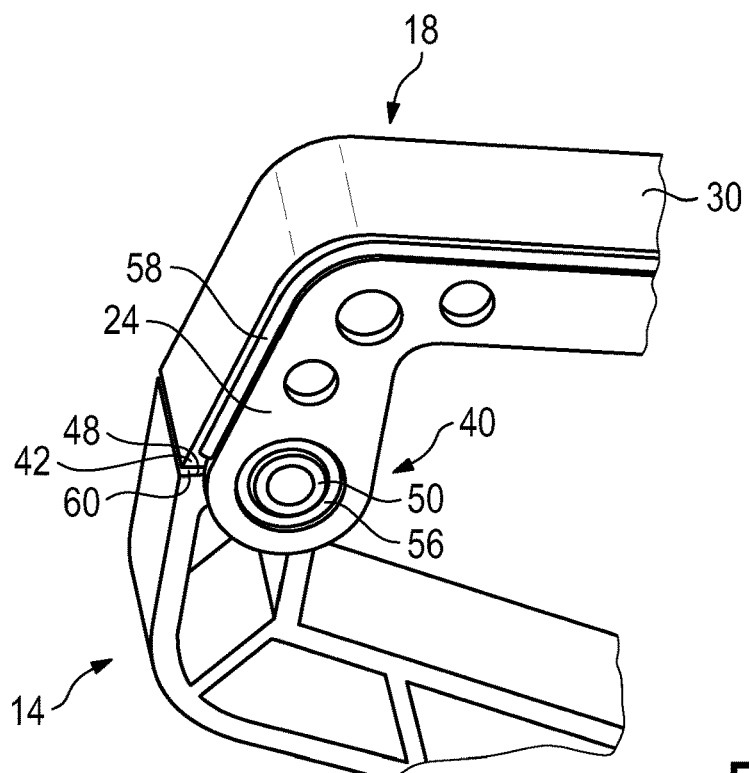
FIG. 13 shows a perspective view of the rotary joint between the coupling link and the first link lever from FIG. 10 together with the coupling link and the first link lever.

As illustrated in FIGS. 12 and 13, the coupling link 18 has a first cover plate 24 and a second cover plate 26 that are identical in design. Through openings 28 are provided in the cover plates 24, 26 for a defined deformation performance in the event of a crash. A spacer body 30 is arranged between the first cover plate 24 and the second cover plate 26. The spacer body 30 is a lightweight construction element and is produced by extrusion. In this embodiment, the spacer body 30 is connected to the cover plates 24, 26 by welding. For this purpose, a hollow groove is formed between the first cover plate 24 or the second cover plate 26 and the spacer body 30 and the respective components are welded to each other at the groove with a weld seam 58.

At a joint 40 with the first link lever 14, the coupling link 18 is formed with an axle bearing 50 arranged between the first and second cover plates 24, 26. The axle bearing 50 is a sleeve that is welded to the two cover plates 24, 26. For this purpose, a V groove 54 is formed in each case in a connecting region between the axle bearing 50 and the two cover plates 24, 26, and a weld seam 56 is formed in the V groove 54.

Figure 10:
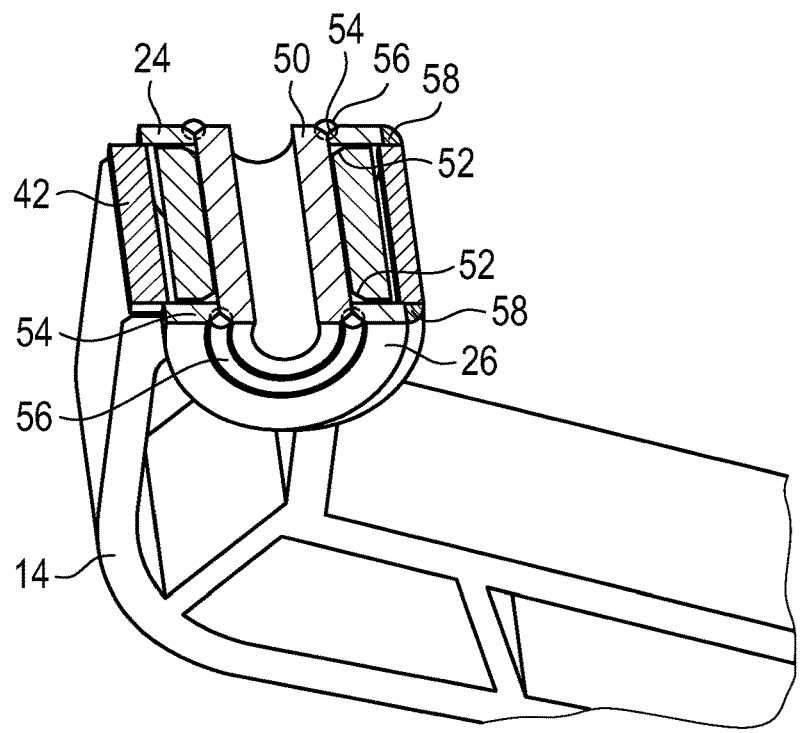
FIG. 10 shows a perspective sectional view of a rotary joint between a coupling link and a first link lever according to a second exemplary embodiment.
Figure 11:
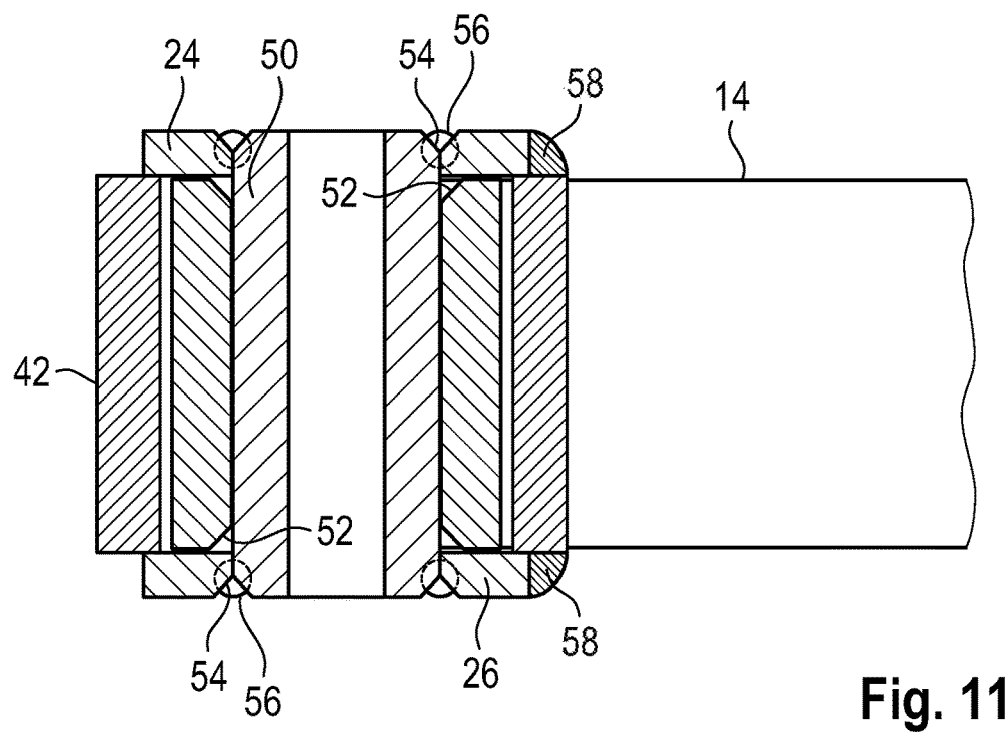
FIG. 11 shows a frontal sectional view of the rotary joint between the coupling link and the first link lever from FIG. 10.

As can best be seen in FIGS. 10 and 11, a bevel 52 for the insertion of the axle bearing 50 in the region of the rotary joint 40 is formed on the first link lever 14.

The coupling link 18 of the second embodiment has, in the region of the rotary joint 40, a reinforcing element 42 that forms a support of the first link lever 14, as has previously been described with respect to the first embodiment. The reinforcing element 42 is designed as a substantially U-shaped or trough-shaped grip, for example in the manner of tongs, for the first link lever 14, and the inner side of the grip has a round profile 44 arranged concentrically with respect to the axle bearing 50. The reinforcing element 42 is arranged on the spacer body 30 and is formed integrally therewith.

The reinforcing element 42 of the coupling link 18 of the second embodiment is formed integrally with a stop 48 for a movement of the first link lever 14. The stop limits movement of the roll bar 12 during opening. For this purpose, a corresponding counter stop 60 is formed on the first link lever 14 by a shoulder formed there.

LIST OF REFERENCE SIGNS

Motor vehicle 10
Roll bar 12
First link lever, inner link 14
Second link lever, outer link 16
Coupling link 18
Extension 20
Actuating system 22
First cover plate 24
Second cover plate 26
Through opening 28
Spacer body 30
Axle bearing 32
Bearing bolt, axle 34
Rotary joint 40
Reinforcing element 42
Round profile 44
Bottom profile 46
Stop 48
Axle bearing 50
Bevel 52
V groove 54
Weld seam 56
Weld seam 58
Counter stop 60

What is claimed is:

1. A coupling link for a hinged roll bar of a motor vehicle, the roll bar being configured as a four-bar linkage, comprising:
a first cover plate, a second cover plate that is separate from the first cover plate, wherein the first cover plate and the second cover plate are arranged spaced apart from each other, an axle bearing connected to the two cover plates for forming a rotary joint with a first link lever that can be mounted on the axle bearing, and a spacer body disposed between the first cover plate and the second cover plate and connected to both the first cover plate and the second cover plate, the spacer body having a reinforcing element in a region of the rotary joint, the reinforcing element having a round concave profile that is concentric with the axle bearing, the round concave profile forming a support of the first link lever, the round concave profile including an edge forming a stop for limiting movement of the first link lever toward the coupling link.

2. The coupling link of claim 1, wherein the reinforcing element and the first and second cover plates form a substantially U-shaped or trough-shaped grip for the first link lever.

3. The coupling link of claim 1, wherein the first cover plate and the second cover plate are welded to the spacer body.

4. The coupling link of claim 1, wherein the coupling link has opposite first and second ends, the axle bearing being at the first end of the coupling link, an axle being at the second end of the coupling link and being configured for connecting to a second link lever, and an end of the spacer body opposite the axle bearing having a base profile that forms a reinforcement of the axle.

5. The coupling link of claim 1, wherein the axle bearing is attached in a form-fitting manner to the first and second cover plates.

6. The coupling link of claim 5, wherein the axle bearing is welded to the first and second cover plates.

7. The coupling link of claim 6, wherein V grooves are formed in a connecting region between the axle bearing and the first and second cover plates, and the axle bearing is welded to the first and second cover plates in the V grooves.

8. The coupling link of claim 1, wherein the stop is integral with the reinforcing element and is parallel to the axle bearing.

9. A roll bar for a motor vehicle comprising first and second link levers that can be coupled to a motor vehicle body, the coupling link of claim 1 being connected in an articulated manner between the first and second link levers, and an actuating system for pivoting the first and second link levers and the coupling link between a position retracted in the motor vehicle body and a position extended out of the motor vehicle body.

10. The roll bar of claim 9, wherein the actuating system has a first end configured to be connected to the motor vehicle body at a position spaced from the coupling link and a second end connected to a position where the coupling link is articulated to the second link.

11. The roll bar of claim 10 wherein the actuating system is telescopic and expands when pivoting the first and second link levers and the coupling link into the position extended out of the motor vehicle body.

12. The roll bar of claim 9, wherein ends of the coupling link and the first link lever that are connected to one another are substantially L-shaped.

* * * * *